Aug. 18, 1931.  A. W. GRANT, JR  1,819,839
MANUFACTURE OF CARBURETED GAS
Filed Jan. 22, 1925   2 Sheets-Sheet 2

INVENTOR

Patented Aug. 18, 1931

1,819,839

UNITED STATES PATENT OFFICE

ALBERT W. GRANT, JR., OF WILMETTE, ILLINOIS, ASSIGNOR TO THE KOPPERS COMPANY, OF PITTSBURGH, PENNSYLVANIA, A CORPORATION OF PENNSYLVANIA

MANUFACTURE OF CARBURETED GAS

Application filed January 22, 1925. Serial No. 3,974.

This invention relates to the manufacture of enriched fuel gas, and is particularly useful in the manufacture of producer gas which is enriched or carbureted by the addition of a liquid hydrocarbon which is thereafter vaporized and cracked.

In my copending application, Serial No. 3973, filed of even date herewith, there is described and claimed an apparatus wherein carburetion of a fuel gas is carried on in the absence of oxygen, and various other features of my broad invention are more fully set out. The present application is particularly directed toward a form of apparatus embodying certain features of my copending application above specified, and also embodying certain highly desirable features of construction and operation in the continuous production of enriched gas.

I provide an apparatus comprising a plurality of carburettors and supply gas thereto in a substantially continuous manner from any desired source, as, for example, a single gas producer operating in a continuous manner. Each of the carburettors operates in two phases, the first of which is termed the primary phase, during which gas is burned to heat the carburettor, and the other of which is termed the secondary phase, during which gas is supplied to the heated carburettor and an enriching agent, such as a hydrocarbon oil, is added thereto, the heat of the carburettor being sufficient to vaporize and crack the enriching agent to form a permanent fixed gas so that there results a product of considerably higher thermal value than the gas supplied to the apparatus. I provide for operating the several carburettors out of phase with one another and substantially simultaneously changing the phase of the carburettors. In this manner the apparatus may be operated to continuously produce an enriched gas which, if desired, may be mixed with an unenriched gas to secure a gas of desired thermal value. For example, the products of combustion from the primary phase may be mixed with enriched gas resulting from the secondary phase. This is especially desirable since both gases are of near the same specific gravity so that by suitable admixture of the two there may be produced a gas of substantially constant specific gravity and of any desired thermal value within limits.

In the accompanying drawings illustrating the present preferred embodiment of my invention:—

Figure 1:
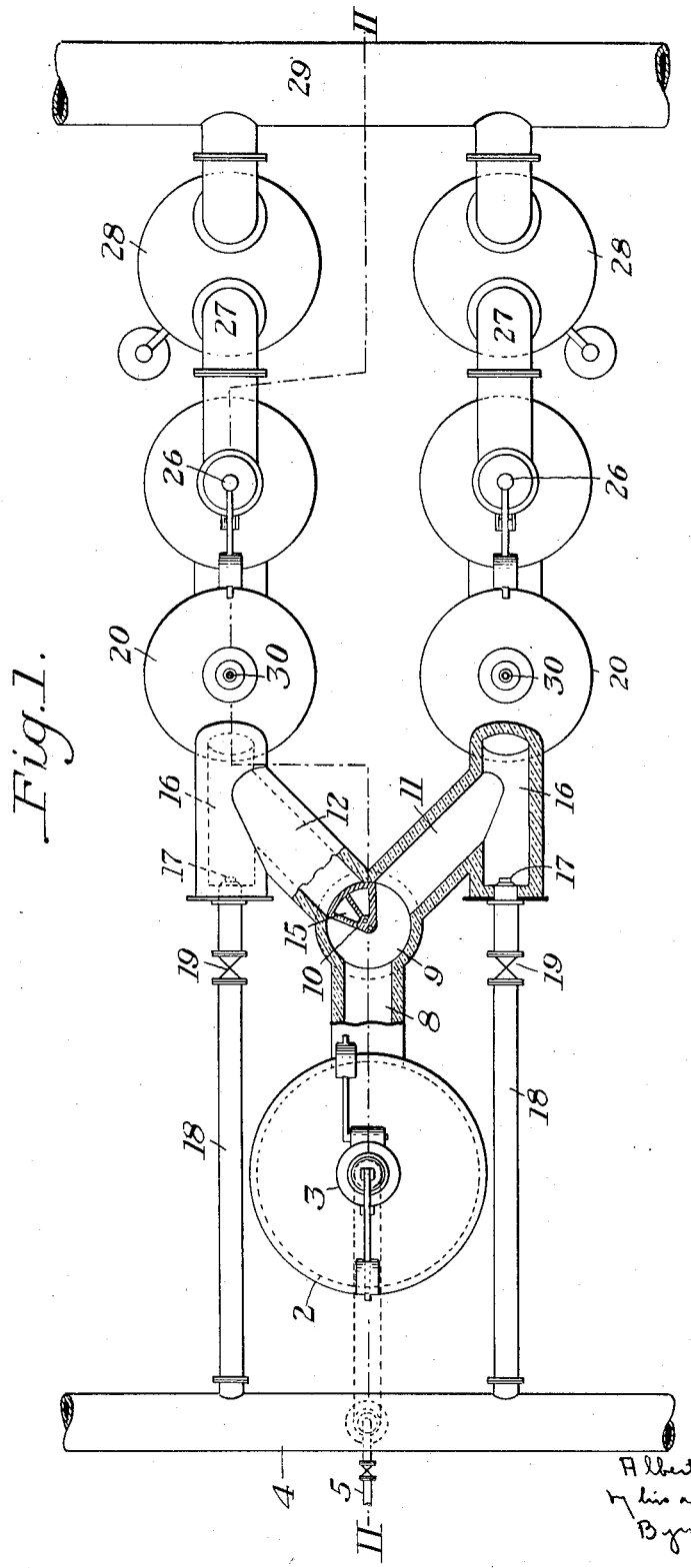
Figure 2:
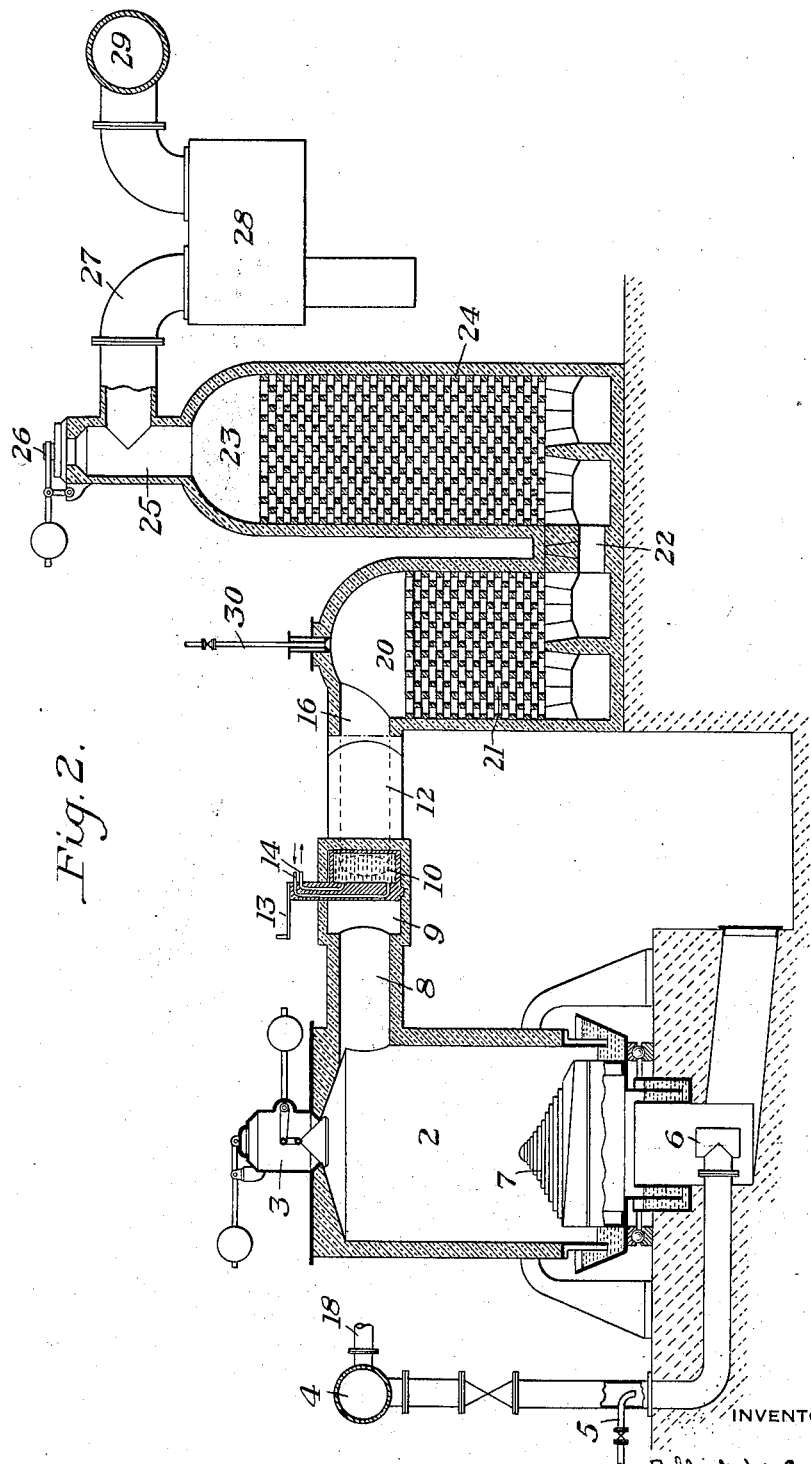

Figure 1 is a top plan view, partly broken away, of an apparatus embodying one producer and two carburetting units, and Figure 2 is a vertical section taken on the line II—II of Figure 1.

In the illustrated embodiment of the invention producer gas is supplied in a substantially continuous manner by a gas producer 2 of any desired type. The one illustrated is of a well known type, although, as above stated, any other form of producer may be used. Fuel such as coal or coke, is supplied through a feeder 3; air or oxygen is supplied from a main 4, and steam is supplied through a conduit 5. The primary air or oxygen saturated with steam, leaves a nozzle 6 and passes through the fuel bed on the grate 7. The producer gas formed is supplied through a conduit 8 to a valve chamber 9 having a movable valve member 10 therein. Conduits 11 and 12 lead from the valve chamber 9 to the carburetting units.

The valve member 10 has substantially the form of a sector of a circle and is provided with an operating lever 13. Water circulation is provided in the valve as by conduits 14 leading to the cored out openings 15 in the valve member. It will be seen from Figure 1 that the valve member 10 may be moved to any desired position so as to entirely open or close the conduits 11 and 12 or to such intermediate positions as to secure any desired proportional division of flow through the conduits 11 and 12.

The two carburetting units are identical and a description of one alone will suffice. Each unit is provided with a conduit 16 into which the branch conduit 11 or 12 discharges. This conduit 16 is provided with an air or oxygen nozzle or tuyère 17. This tuyère is connected to the air main 4 by a pipe 18 having a valve 19 therein whereby regulation of the secondary air may be secured. During the primary phase the valve member 10 is so positioned as to admit a desired quantity of producer gas to the conduit 16, wherein it is burned by reason of the admission of air or oxygen through the tuyère 17. The burning gases pass into a carburettor 20 which is preferably provided with checker brick 21 for storing the heat of combustion, and then pass under an arch 22 to a superheater 23 which is also preferably provided with checkerbrick 24.

The superheater is provided with a stack 25 having a stack valve 26, and is also provided with a conduit 27 leading through a wash box 28 to the gas main 29. During the primary phase the products of combustion may be discharged either through the stack 25 by opening the valve 26, or may be discharged through the wash box 28 to mix with the rich gas being produced in the alternate unit of the apparatus.

As above stated, the second unit is out of phase with the unit just described and while the first is on the primary phase the second is on the secondary phase. When the temperature passes out of a desired range the phase of the carburettors is reversed and the carburetting apparatus which has just been described is changed over to the secondary phase for the purpose of producing enriched gas.

During the secondary phase the valve 19 is closed so that secondary air is no longer admitted to the carburetting unit but the producer gas alone passes into the carburettor 20. A suitable enriching agent, such as tar or oil, is admitted through a conduit 30 and is sprayed over the checker work 21. The hot checkers vaporize the oil and the mixture of gas and vaporized oil passes into the superheater 23 where the vapor is cracked and transformed into permanent fixed gases. It will be understood that there is no definite line of division between the vaporizing and cracking operations and that they may both be performed in the same chamber if desired, and that while one of such chambers has been described herein as a carburettor and the other as a superheater it will be understood that in general the term carburettor is broad enough to cover both chambers. The enriched gas is passed through the conduit 27 and the wash box 28 into the main 29.

It will be noted that the addition of the enriching agent takes place in the absence of oxygen and, as particularly set forth in my copending application, this is highly advantageous in that no combustion of the enriching agent takes place and there is no deposition of soot or similar matter through the carburettor and superheater.

When a carburetting unit is shifted from the secondary phase to the primary phase the valve member 10 may be adjusted, if desired, to vary the proportion of the total quantity of gas produced which is being supplied to such unit and correspondingly vary the proportion supplied to the unit which is now on the primary phase. In practice a relatively minor quantity of the gas is required for the primary phase.

I thus provide a highly advantageous arrangement wherein enriched gas may be produced continuously and the same may be mixed, if desired, with a gas of lower thermal value, such as the products of combustion of a carburetting unit on the primary phase, or unenriched producer gas taken from another source, or taken from the same source and by-passed around the carburetting unit, so as to suitably regulate the thermal value of the gas produced. This thermal value may be regulated in a number of other ways, as, for example, controlling the amount of secondary air supplied, the quantity and character of the enriching agent used, and so forth.

When a reversal of phase on a unit occurs it is desirable to permit the apparatus to purge itself of gases from the last phase for about a minute before the secondary air is turned on, after which the primary phase is carried on as above described. If desired, the primary phase may be accomplished by burning liquid fuel, such as the carburetting agent employed, and this may be done, if desired, by operating the sprays 30 as burners. Where this is done the valve member 10 is shifted to close the gas conduit for that particular unit entirely and air is supplied through the tuyère while oil is supplied through the spray burner so as to cause combustion of the oil during the primary phase and thus heat the unit while the entire product of the producer 2 is being enriched in the other unit. This procedure is of special advantage where the price of the enriching agent is low in comparison with the price of gas.

An important advantage of this installation is the fact that one carburetting unit may be shut down for repairs, replacement or inspection without in any way interfering with the production of the machine except to make such production intermittent for the time being since it is obvious that a single unit alone may be operated apart from the other in the manner above described.

While I have illustrated a preferred embodiment of the invention it will be understood that the invention is not limited thereto but may be otherwise embodied within the scope of the following claims.

I claim:

1. The process of manufacturing carbureted producer gas in apparatus comprising a gas producer adapted to contain a bed of solid carbonaceous fuel and a pair of carburettors located in parallel, which comprises continuously passing a mixture of oxygen-containing gas and steam through said fuel bed to generate producer gas, supplying fluid fuel to one of said carburettors and there burning it with a further quantity of oxygen-containing gas to heat said carburettor, simultaneously passing producer gas through the other and previously heated carburettor and there carburetting said gas with oil, and periodically reversing the operation of the caburettors.

2. The process of manufacturing carbureted producer gas in apparatus comprising a gas producer adapted to contain a bed of solid carbonaceous fuel and a pair of carburettors located in parallel, which comprises continuously passing a mixture of oxygen-containing gas and steam through said fuel bed to generate producer gas, supplying fluid fuel to one of said carburettors and there burning it with a further quantity of oxygen-containing gas to heat said carburettor, simultaneously passing producer gas through the other and previously heated carburettor and there carburetting said gas, periodically reversing the operation of the carbuettors, and mixing the products of combustion leaving one carburettor with the carbureted producer gas leaving the other carburettor.

3. The process of manufacturing carbureted producer gas in apparatus comprising a gas producer adapted to contain a bed of solid carbonaceous fuel and a pair of carburettors located in parallel, which comprises continuously passing a mixture of an oxygen-containing gas and steam through said fuel bed to generate producer gas, passing a portion of said producer gas through one of said carburettors and there burning it with a further quantity of oxygen-containing gas to heat said carburettor, simultaneously passing a further portion of said gas through the other and previously heated carburettor, and there carburetting said gas, and periodically reversing the operation of the carburettors.

4. The process of manufacturing carbureted producer gas in apparatus comprising a gas producer adapted to contain a bed of solid carbonaceous fuel and a pair of carburettors located in parallel, which comprises continuously passing a mixture of an oxygen-containing gas and steam through said fuel bed to generate producer gas, passing a portion of said producer gas through one of said carburettors and there burning it with a further quantity of oxygen-containing gas to heat said carburettor, simultaneously passing a further portion of said gas through the other and previously heated carburettor, and there carburetting said gas, periodically reversing the operation of said carburettors, and mixing the burned gases leaving one carburettor with the carbureted gas leaving the other carburettor.

5. The process of manufacturing carbureted producer gas in apparatus comprising a gas producer adapted to contain a bed of solid carbonaceous fuel and a pair of carburettors, which comprises continuously passing a mixture of an oxygen-containing gas and steam through said fuel bed to generate producer gas, simultaneously introducing oil and a further quantity of oxygen-containing gas to one of said carburettors to heat the same and introducing producer gas and oil to the other and previously heated carburettor and thereby carburetting said producer gas, and periodically reversing the operation of said carburettors.

6. The process of manufacturing carbureted producer gas in apparatus comprising a gas producer adapted to contain a bed of solid carbonaceous fuel and a pair of carburettors, which comprises continuously passing a mixture of an oxygen-containing gas and steam through said fuel bed to generate producer gas, simultaneously introducing oil and a further quantity of oxygen-containing gas to one of said carburettors to heat the same and introducing producer gas and oil to the other and previously heated carburettor and thereby carburetting said producer gas, periodically reversing the operation of said carburettors, and mixing the products of combustion leaving one carburettor with the carbureted gas leaving the other carburettor.

In testimony whereof I have hereunto set my hand.

ALBERT W. GRANT, JR.